Sept. 23, 1958 F. R. WILSON 2,852,839
ANNULAR CLAMPING BLOCKS WITH TUBE CLAMPING
RECESSES FOR A FLARING TOOL
Filed Feb. 24, 1953 3 Sheets-Sheet 1
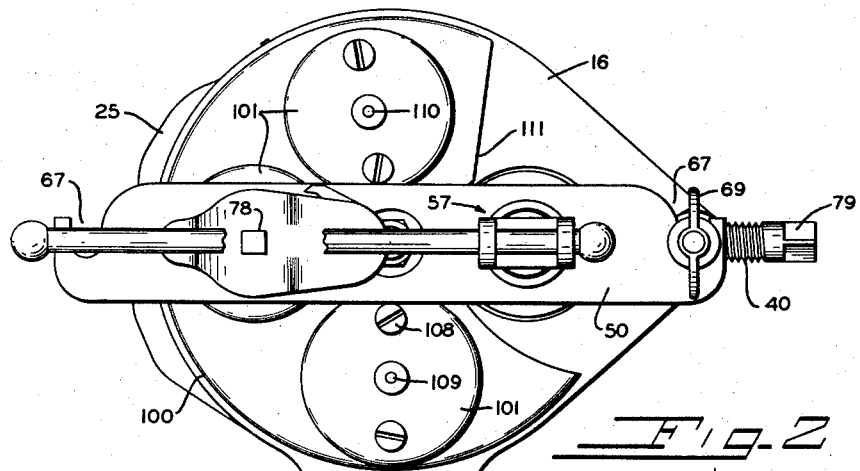
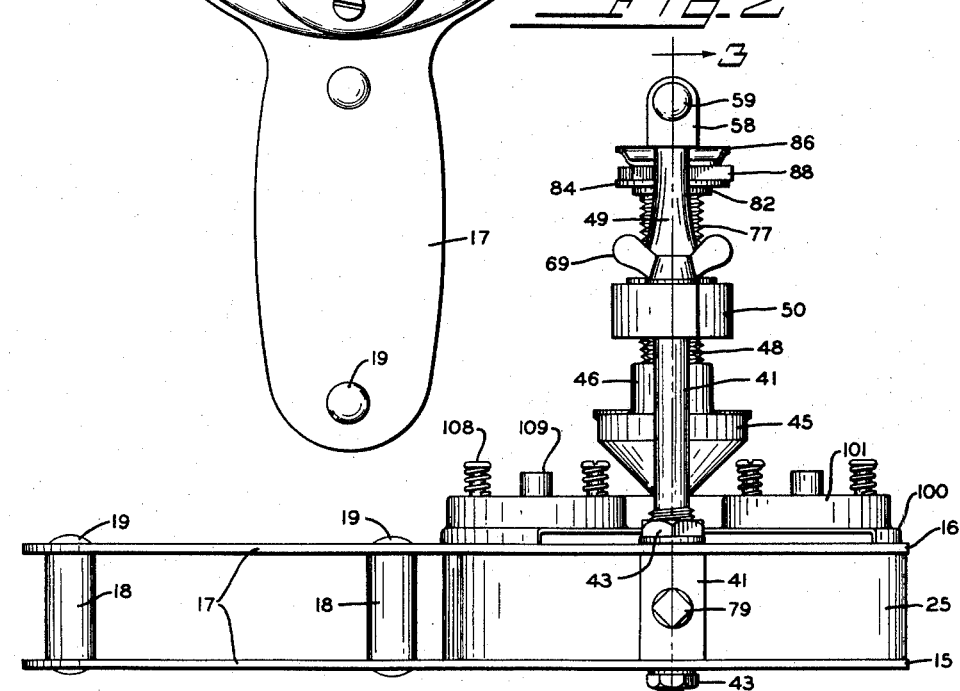
INVENTOR.
FRANK R. WILSON
BY
DES JARDINS, ROBINSON & KEISER
Howard S. Keiser
HIS ATTORNEYS

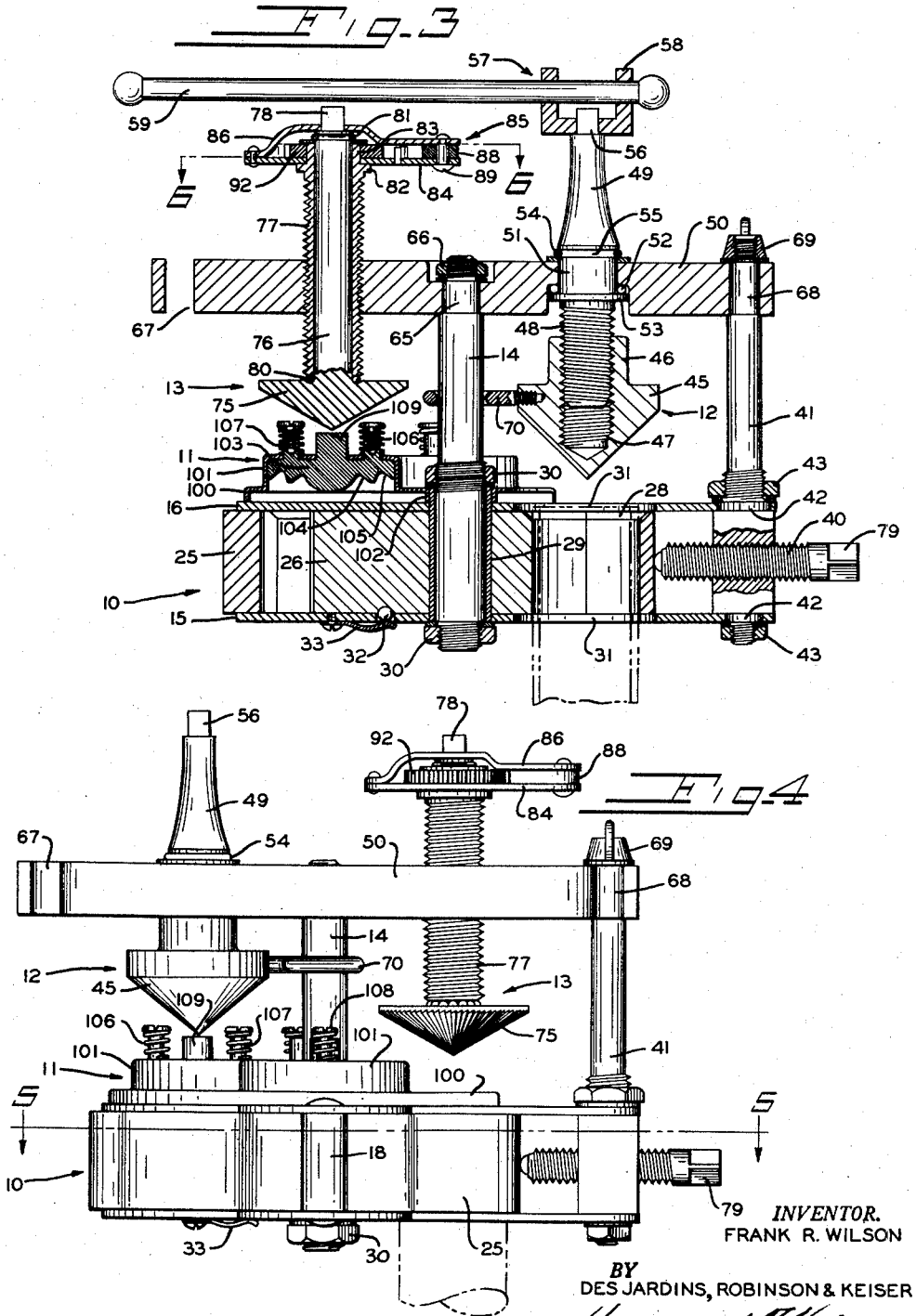

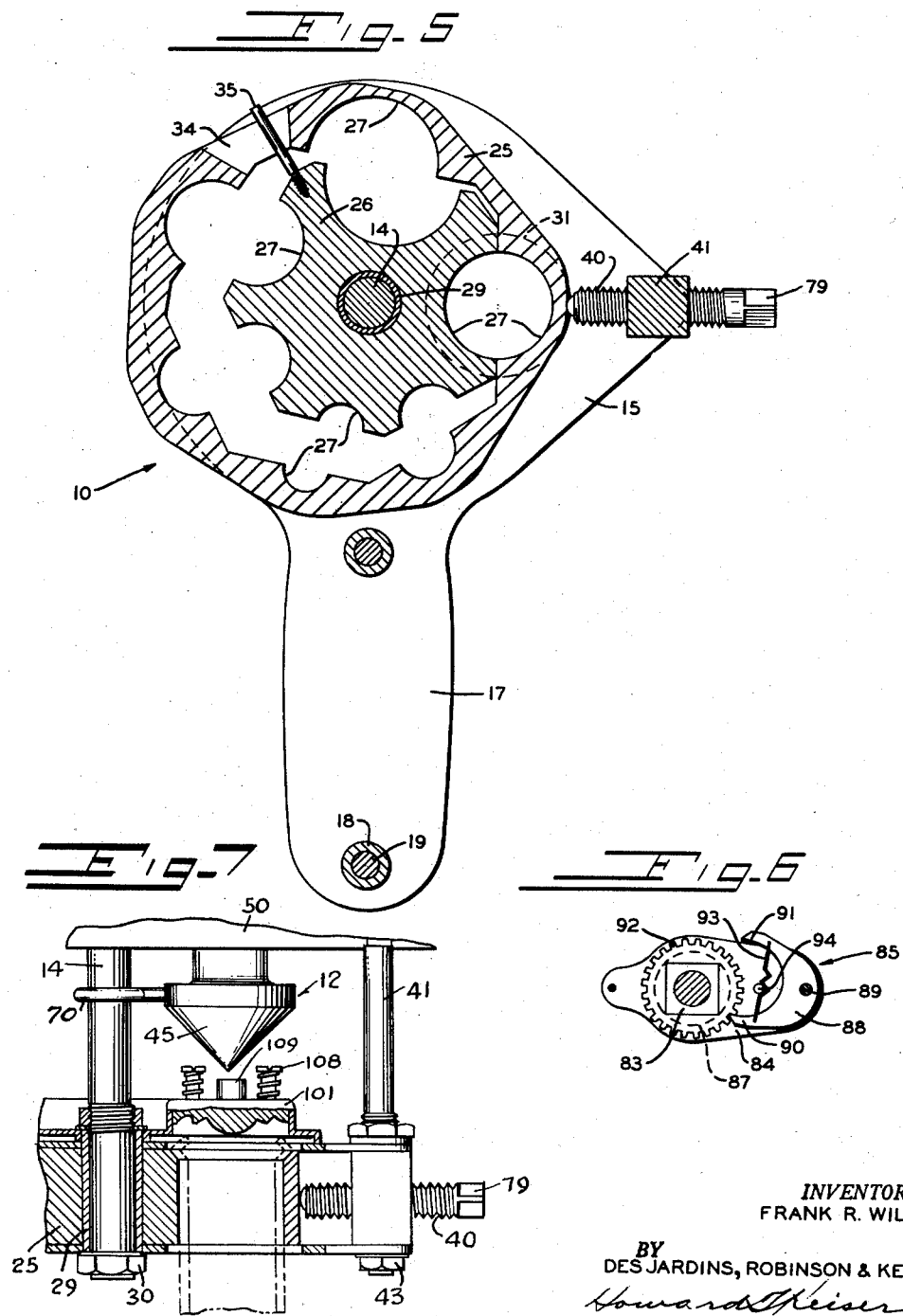

United States Patent Office 2,852,839
Patented Sept. 23, 1958

2,852,839

ANNULAR CLAMPING BLOCKS WITH TUBE CLAMPING RECESSES FOR A FLARING TOOL

Frank R. Wilson, Memphis, Tenn.

Application February 24, 1953, Serial No. 338,303

10 Claims. (Cl. 29—284)

This invention relates to a tube flaring tool, and more particularly to a combination type of tool which is of extremely compact construction while at the same time providing all the features heretofore provided by a plurality of separate tools.

Tube flaring tools are ordinarily used by workmen engaged in the installation or repair of equipment in the field. The tools are usually carried by the workmen in tool kits and it is therefore desirable that they be made as compact and self-contained as possible. By so doing the space taken up by the tool and the weight thereof is kept at a minimum and the possibility of the various component parts thereof becoming separated or lost is greatly reduced. Also, by combining into a single tool all of the features of the different tools usually used in tube flaring operations, the flaring job is made easier and can be performed much more rapidly and conveniently than where a number of separate tools must be handled.

It is, therefore, an object of the present invention to provide a single tool possessing all of the features of the various individual tools usually used in tube flaring operations.

Another object of the present invention is to provide a single, unitary tool for clamping, reaming, shaping and flaring the end of a piece of thin-walled tubing.

Another object of the invention is to provide a circular type of tube clamping means.

Another object of the invention is to provide a feeding mechanism for a reamer which can be disconnected at will so as to permit the reamer to be rotated without feeding.

Another object of the invention is to provide a reamer and a flaring cone mounted on a common, pivoted arm so that either tool may be swung into position over the end of the tube to be flared.

Another object of the invention is to provide a forming die which is capable of preparing tubes of different sizes for the formation of a double flare thereon.

Another object of the invention is to provide a plurality of forming dies, each mounted for sliding movement in an indexable holder so that any one of the dies can be moved into position over the end of the tube to be flared.

Another object of the invention is to provide a slidably and non-rotatably mounted flaring cone which is provided with internal screw threads meshing with the external threads of a rotatably and non-slidably mounted feeding screw.

With these and other objects in view which will become apparent from the following description, the invention includes certain novel features of construction and combinations of parts, the essential elements of which are set forth in the appended claims and a preferred form or embodiment of which will hereinafter be described with reference to the drawings which accompany and form a part of this specification.

In the drawings:

Fig. 1 is a plan view of a flaring tool constituting a preferred embodiment of my invention.

Fig. 2 is a side view of the tool shown in Fig. 1.

Fig. 3 is a cross-sectional view taken along the line 3—3 in Fig. 2.

Fig. 4 is an end view of the tool shown in the preceding figures but with the reamer swung into position above the end of the tube.

Fig. 5 is a cross sectional view taken along the line 5—5 in Fig. 4.

Fig. 6 is a cross sectional view taken along the line 6—6 in Fig. 3.

Fig. 7 is a side view of the tool showing the formation of a double flare on the tube end.

By referring to the tool shown in Figs. 1 to 6, inclusive, of the drawings, which tool constitutes a preferred embodiment of my invention, it will be readily perceived that this is an entirely new type of tool involving new combinations of known elements as well as elements which are novel per se. As the description proceeds, it will be appreciated that with this single tool, all of the operations necessary to the flaring or double-flaring of a tube may be accomplished without removing the tube from the tool. It will also be noted that the tool contains many novel features including an annular type of clamping die, multiple forming dies for preparing the tube for the formation of a double flare thereon, an indexable die holder for enabling anyone of the multiple dies to be swung into or out of position over the end of the tube held in the clamping die, a reamer provided with a burnishing control, and an internally threaded flaring cone which makes for more compact construction of the tool than would be possible with conventional types of flaring cones. Additional novel features of the tool will become apparent from the following detailed description of the exemplified embodiment of my invention.

As indicated in Fig. 4, the flaring tool illustrated herein is comprised of four main units, namely, a clamping die 10 for holding the tube to be flared, a plurality of forming dies 11 mounted in a die holder which can be rotated to bring any selected one of the forming dies into position over the end of the tube, a flaring cone 12 and a reamer 13 mounted on opposite ends of a pivoted arm which may be rotated to bring either the reamer into position over the end of the tube to be flared as shown in Fig. 4, or to bring the flaring cone thereover as shown in Fig. 3.

These four main component parts of the tool are supported on a common axle 14 which, together with the spaced clamping die plates 15 and 16 comprise what may be referred to as the body or frame of the flaring tool. The plates 15 and 16 are identical as to shape and size and each is provided with a projecting handle portion 17 which provides a convenient means for handling the tool and holding it against movement during tube flaring operations. The plates 15 and 16 are held in spaced relation by a pair of spacing sleeves 18 through which pass rivets 19 which extend through holes provided in the plates 15 and 16 and are swaged over on the outer faces of the plates to hold them rigidly in their spaced relation.

The plates 15 and 16 serve to support between them my novel annular form of clamping die which is of exceptionally compact construction and which includes an annular clamping block 25 (Fig. 5) within which is situated an inner clamping block 26 which is journaled for rotation about the axle 14. Each block is provided with a plurality of semi-cylindrical clamping recesses 27 of different sizes, the recesses in the block 25 matching those in the block 26. Each pair of matching recesses comprises a tube clamping die for seizing and holding a particular size of tube. As shown in Fig. 5, there are six recesses 27 of different size in each block so that six different sizes of tubes may be accommodated by the clamping die. Each recess 27 is chamfered around its upper edge, as indicated by reference numeral 28 in Fig. 3, the angle of each chamfer corresponding to the angle of the flaring cone so that when the cone is forced into the end of the tube, it will expand the tube into intimate contact with the chamfered face 28 formed on the clamping die.

The clamping block 26 is provided with a central bore which has a free running fit on a sleeve 29 which surrounds the lower end of the axle 14. If desired, this sleeve may be formed as an integral part of the axle 14 rather than as a separate sleeve as shown herein. The sleeve is clamped to the axle by nuts 30 which are received on threaded portions of the axle and are tightened down against washers interposed between the nuts and the ends of the tube 29. Accordingly, the clamping block 26 may be rotated so as to bring any one of the recesses 27 formed therein into alignment with a pair of vertically aligned apertures 31 provided in the plates 15 and 16. To facilitate alignment of the recesses 27 in the block with the apertures 31, the block 26 is provided on its lower face with a series of dimples for receiving a ball detent 32 which is received in a hole provided in the lower plate 15 and is resiliently urged into engagement with the dimples in the block 26 by a leaf spring 33 attached to the plate 15. The dimples are so spaced around the block 26 as to register with the ball detent 32 whenever a recess 27 is in alignment with the apertures 31.

It will be noted from Fig. 5 that the clamping block 26 is in the form of an irregular six-sided polygon, the sides containing the larger recesses 27 being longer than those containing the smaller recesses. By this construction, the block may be made smaller and lighter than the conventional prior art clamping blocks which were in the form of a regular polygon with sides of equal length. This feature is disclosed and claimed in my copending application Serial No. 274,403, filed March 1, 1952, and issued June 28, 1955, as Patent No. 2,711,773, for Tube Flaring Tool.

The annular clamping block 25 is of such thickness as to be freely slidable in the space between the plates 15 and 16 and is of such diameter as to permit the matching recesses 27 to be separated sufficiently to enable a tube which has been flared to be withdrawn from the clamping die. The annular clamping block 25 is connected with the inner block 26 for substantially conjoint rotational movement while at the same time permitting independent sliding movement of the block 25 with respect to the block 26. For this purpose, the block 25 is provided with an elongated slot 34 within which is received a pin 35 projecting from the block 26. Hence, as the annular block 25 is rotated, it will carry the block 26 with it and maintain the matching recesses 27 in the two blocks in substantial alignment as the blocks are rotated to bring the desired size of clamping die into position between the apertures 31. Rotation of the clamping blocks is accomplished by grasping the annular block 25 with the hand and rotating the same in either direction until the desired size of die is brought into alignment with the apertures 31. As the block 25 is thus rotated, the inner block 26 will be constrained to rotate in unison therewith by reason of the pin and slot connection 34, 35.

After the die of desired size is aligned with the apertures 31, the tube to be flared is inserted in the tool as indicated in phantom outline in Fig. 3 after which the annular clamping block 25 is forced against the inner clamping block 26 by means of a clamping screw 40 which is received in a tapped hole extending transversely through the lower end of a swivel post 41. As shown in Fig. 3, the lower end of the post is provided with shoulder portions 42 which are received in suitable holes provided in the plates 15 and 16. The holes in the plates are of such size as to snugly receive the shoulder portions 42 while at the same time permitting rotation of these portions within the holes. The swivel post 41 is provided with screw threads above and below the portions 42 for receiving retaining nuts 43 which are screwed down against washers interposed between the nuts and the shoulder portions 42. Hence, when it is desired to release a tube which has been flared from the clamping die, the screw 40 may be loosened after which it may be swung clear of the clamping block 25 by swinging the screw together with the swivel post 41 through an angle of approximately 90°. The clamping block 25 will then be free to slide a considerable distance to the right as viewed in Fig. 5 so as to completely release the flared tube from the die and permit the flared end to be withdrawn from the die.

In order to provide a flare upon the end of a tube clamped within the clamping die 10, a flaring cone 45 (Fig. 3) is so arranged that it may be swung over the end of the tube and thereafter advanced downwardly into the tube so as to spread the end of the tube outwardly into engagement with the chamfer 28 provided around the upper edge of the die opening. As shown in this figure, the cone 45 is provided at its lower end with the usual conical flaring surface and is provided at its upper or base end with a shank 46. In the base of the cone is an internally threaded bore 47 which meshes with threads 48 provided on the lower end of an operating spindle 49. The spindle 49 is rotatably journaled in a pivoted arm 50 by means of a machined cylindrical surface 51 thereon which is received in a bore provided in the arm 50. Upward thrust produced on the spindle 49 as the cone is being forced into the end of the tube is taken up by a ball bearing 52 interposed between a flange 53 provided on the spindle and a recessed seat provided in the under side of the arm 50. The spindle is retained in place in the arm by means of a snap ring 54 which is adapted to seat in a groove 55 provided in the spindle above the arm 50. The spindle 49 is provided at its upper end with a square shank 56 by means of which the spindle may be rotated by a wrench 57. This wrench consists of a yoke 58, the arms of which are bored to receive a turning handle 59, the bail of the yoke being provided with a square hole for receiving the square shank 56.

The arm 50, upon which the flaring cone 45 is supported, is journaled for rotation on the upper end of the axle 14. For this purpose the axle is provided at its upper end with a tenon 65 which is received within a bore provided in the center of the arm 50. The arm is retained on the tenon 65 by means of a retaining nut 66 screwed onto the threaded end of the axle 14 and tightened down against washers interposed between the nut and the tenon 65. By means of this construction, the arm 50 may be swung about its pivot on the axle 14 so as to bring either the flaring cone or the reamer into position over the end of the tube to be flared. In order to secure the arm 50 in either of its selected positions, the arm is provided at each end with a notch 67 which is adapted to engage with a tenon 68 provided on the upper end of the swivel post 41 when the arm is swung to either its reaming or flaring position. The upper end of the post 41 is threaded to receive a wing nut 69 which may be tightened to clamp the arm in place with either the flaring cone or the reamer located above the tube held in the clamping die 10.

To prevent the flaring cone 45 from rotating with the operating spindle 49 as the latter is turned by the wrench 57, an eyebolt 70 is screwed into a tapped hole provided in the side of the cone, the eye of the bolt being received over the axle 14 so as to permit the bolt to slide up and down along the axle as the cone is fed into or out of engagement with a tube held in the clamping die. Since the cone 45 is held stationary as the operating spindle 49 is rotated, the meshing engagement of the threads 47 and 48 on the cone and spindle, respectively, will cause the cone to be fed upwardly or downwardly on the spindle as the latter is revolved in one direction or the other.

Before flaring the end of a tube held in the clamping die 10, it is usually preferable to dress off the end of the tube to remove any burr thereon before running the flaring cone into the tube. This may be accomplished by a conventional rose reamer 75 which is carried on the lower end of a spindle 76. The spindle 76 is journaled within a threaded sleeve 77 which is received within a tapped hole provided in the arm 50. The spindle 76 is provided at its upper end with a square shank 78 for turning the reamer 75. The shank 78 is preferably the same size as the square shank 56 on the flaring cone spindle so that the same wrench 57 may be used for rotating either the cone or the reamer. The tightening screw 40 for the clamping die is also preferably provided with a square head 79 which also corresponds in size to the shanks 78 and 56 so that the wrench 57 may be used to tighten the clamping die on the tube to be flared.

To permit free turning of the reamer 75 and spindle 76 relative to the sleeve 77 regardless of the thrust produced on the reamer by the end of the tube operated upon, an anti-friction bearing is interposed between the lower end of the sleeve 77 and the upper face of the reamer 75. In the present embodiment of my invention, this bearing is in the form of small steel balls 80 running in raceways provided in the lower end of the sleeve and the upper face of the reamer. It is to be realized, of course, that any other suitable form of antifriction bearing might be substituted in place of the balls 80.

The spindle 76 is retained within the sleeve 77 by means of a snap ring 81 which engages with a groove formed in the upper end of the sprindle and retains a washer which is interposed between the snap ring and the upper end of the sleeve 77.

The reamer of the present invention is provided with a burnishing control whereby after the reamer has been fed down against the end of the tube to remove any burr therefrom, the feed may be released and the reamer rotated without further advancement so that any roughness or teeth marks will be removed and a smooth, polished beveled surface will result. For this purpose a pawl and ratchet drive is provided between the spindle 76 and the threaded sleeve 77. By shifting the position of the pawl, the operator of the tool may determine whether the spindle and sleeve are to rotate together as a unit to effect downward feeding of the reamer, or whether the sleeve is to be permitted to remain stationary while the spindle revolves to effect a smoothing action of the reamer against the work.

As shown in Figs. 3 and 6, the upper end of the sleeve 77 is provided with an annular flange 82 which is surmounted by a square shank 83. Resting on the flange 82 is a bottom plate 84 of a driving arm 85. The plate 84 is provided with a circular aperture 87 (Fig. 6) which fits over the square shank 83 and permits the plate to rotate with respect to the sleeve 77. The driving arm 85 also includes an upper plate 86 which is provided near its center with a square aperture for receiving the square shank 78 on the upper end of the spindle 76. The driving arm 85 is therefore constrained to rotate with the spindle 76 but is free to rotate relative to the threaded sleeve 77 by virtue of the aperture 87 (Fig. 6) which is large enough to slip over the square shank 83 on the upper end of the sleeve. A driving pawl 88 is mounted for pivotal movement between the plates 84 and 86 of the driving arm by a pin 89 passing through the plates and the pawl. The pawl 88 is of double ended construction and includes an advancing finger 90 and a backing off finger 91. These fingers are adapted to engage with the teeth of a ratchet 92 which is provided with a square hole corresponding in size to the square shank 83 on the sleeve. Hence, when the pawl and ratchet drive is assembled as indicated in Fig. 3 with the ratchet 92 in place on the square shank 83, the ratchet and sleeve will be keyed for conjoint rotation as are the pawl 88 and spindle 76. A detent spring 93 is carried by the pawl 88 between the fingers 90 and 91, this spring being provided with a pair of V-shaped notches for receiving a pin 94 projecting upwardly from the bottom plate 84. Thus, the pawl 88 will be resiliently held with either the advancing finger 90 or the backing off finger 91 in engagement with the teeth of the ratchet.

When the ratchet is in the position shown in Fig. 6 with the advancing finger 90 in engagement with the teeth of the ratchet, rotation of the spindle 76 in a clockwise direction by the wrench 57, will cause the finger 90 to engage between the teeth of the ratchet and cause the threaded sleeve 77 to be rotated clockwise in unison with the reamer spindle. Hence, the reamer will be fed downwardly to engage the reamer 75 with the end of the tube and remove any burr which might be present thereon. After the reaming operation has been completed, the operator can, by flicking the pawl 88 into the position in which the backing off finger 91 engages between the teeth of the ratchet, disconnect the drive between the spindle 76 and the sleeve 77 so that the spindle may continue to rotate clockwise while the sleeve remains stationary. Thus, there will be no further downward feeding movement of the reamer and a few turns of the reamer will serve to remove any teeth marks or roughness on the chamfered surface formed by the reamer on the end of the tube. The backing off finger 91 will ratchet freely over the teeth of the ratchet 92 as the spindle is turned clockwise permitting the sleeve 77 to remain at rest. The anti-friction bearing 80 facilitates this operation since it provides for substantially frictionless engagement between the reamer and the sleeve 77. In other words, the frictional restraint between the threads of the sleeve 77 and the internal threads on the arm 50 is greater than that between the sleeve and the spindle so that the sleeve will remain stationary while the reamer rotates. If the operator now rotates the wrench 57 counterclockwise, the backing off finger 91 will engage between the teeth of the ratchet and cause the sleeve 77 to rotate with the spindle 76 in a counterclockwise direction thereby withdrawing the reamer from the end of the tube. When it is again desired to ream the end of a tube held in the clamping die, all that the operator needs do is flip the ratchet 88 to the position shown in Fig. 6, so that upon clockwise rotation of the handle, the sleeve 77 will be rotated clockwise by the finger 90 and feed the reamer downwardly into engagement with the tube.

For certain types of thin walled tubing, it is desirable to provide a double flare, i. e., a flare formed of two thicknesses of metal in place of one. This is accomplished by forcing a forming die against the end of the tube to bell out the end of the tube and form an inwardly directed lip thereon as indicated in phantom outline in Fig. 7. After this preliminary forming operation has been accomplished, a double flare can then be produced by running the flaring cone down into the tube in the usual manner so as to fold the end of the tube back on itself to form a double flare. In the tool shown herein, I have provided a set of forming dies for fitting different sizes of tubes held in the clamping die so that, if desired, a double flare may be produced on the end of a tube instead of a single flare. The forming dies, indicated generally at 11, are supported by a sheet metal tie holder 100 which is preferably made of a single piece of metal having inverted cups 101 formed therein to provide recesses for receiving and holding the individual forming dies. At its center, the holder 100 is formed with a bearing sleeve 102 which is adapted to be received on the sleeve 29 surrounding the lower end of the axle 14 and journal the holder for rotation about the axle. The nut 30 and washer located therebeneath serve to retain the holder in place on the upper face of the plate 16.

Since the present tool is adapted to handle six different sizes of tubing, the holder 100 is provided with three cups 101 (Fig. 1) each containing a forming die 103. Each die 103 is in the form of a cylindrical button provided with two concentric pressure faces 104 and 105 for providing the preliminary shaping of two different sizes of tubes.

Each forming die is provided with a peripheral face which engages with the sides of its cup 101 to guide the die for vertical sliding movement within the cup. Each die is resiliently held in its raised position, as shown in Fig. 3, by compression springs 106 which surround stems 107 projecting from the upper face of the die. Each stem passes through a hole provided therefor in its cup 101 and is provided in its upper end with a tapped hole to receive a spring retaining screw 108, the spring 106 being compressed between the head of the screw and the upper surface of the cup 101. Each die is also provided with a central eminence 109 which, as shown in Figs. 1 and 3, is provided with a conical seat 110 for receiving the point of the flaring cone 45. When the flaring cone is centered over a tube held in the clamping die as shown in Fig. 3, and the die holder 100 is indexed to bring the proper size forming die into position over the end of the tube, the point of the flaring cone will lie above the seat 110 in the forming die. Hence, when the spindle 49 of the flaring cone is rotated by the wrench 57 in a clockwise direction, the cone will center in the seat 110 and press the forming die 101 down against the tube. This will cause the pressure face 104 or 105 thereon corresponding to the size of the tube held in the clamping die, to form over the end of the tube and give it the shape indicated in phantom outline in Fig. 7. After this has been done and the flaring cone 45 retracted from said seat 110, the holder 100 is turned about the axle 14 so as to bring the cut-out portion 111 of the holder into the position shown in Fig. 1 so as to uncover the end of the tube and permit the flaring cone 45 to be pressed down into the tube to complete the double flare thereon.

While the manner of using my new and improved form of tube flaring tool should be evident from the foregoing description thereof, a brief statement of its operation in forming either a single or double flare on the end of a tube will now be given.

Holding the handle 17 of the tool with his right hand, the operator, with his left hand, grasps the annular clamping die 25 and rotates the same to bring the proper size of die opening into alignment with the apertures 31 formed in the plates 15 and 16. As the annular block 25 is rotated, the inner clamping block 26 will likewise be turned about the axle 14 by reason of the engagement of the pin 35 thereon with the slot 34 in the annular clamping block 25. When the proper size recess 27 in the inner clamping block 26 is brought into alignment with the apertures 31, the ball 32 (Fig. 3) will seat within the dimple provided in the bottom of the block and yieldingly retain the block in its adjusted position. The tube to be flared is now inserted into the clamping die and the clamping screw 40 is swung into clamping position and tightened by means of the wrench 57 so as to securely fasten the tube within the clamping die.

The reamer 75 is now swung into position over the end of the tube which projects upwardly a short distance above the surface of the plate 16. The wing nut 69 is then tightened to clamp the arm 50 in position after which the wrench 57 is applied to the square shank 78 on the spindle 76 of the reamer. The pawl 88 is moved to the position shown in Fig. 6 so that the advancing finger 90 engages between the teeth of the ratchet 92. Hence, upon clockwise rotation of the wrench, the threaded sleeve 77 will be rotated in unison with the reamer so as to feed the same downwardly into engagement with the end of the tube. After the burr has been removed from the tube, the pawl 88 is flipped so as to bring the backing off finger 91 into engagement with the ratchet after which several additional clockwise turns of the wrench will serve to remove any tooth marks from the chamfer formed by the reamer. During the several additional clockwise rotations of the reamer, the sleeve 77 will remain stationary since the frictional restraint between the threads thereof and the internal threads of the hole in the arm 50 is greater than the frictional restraint between the spindle and the sleeve. Since the detent spring 93 applies only a light pressure on the pawl 88, the finger 91 will ratchet lightly over the teeth of the ratchet 92 without any tendency to rotate the sleeve 77. The wrench 57 is then rotated counterclockwise to cause the finger 91 to engage between the teeth of the ratchet 92 and so cause the sleeve 77 to be rotated counterclockwise to withdraw the reamer from the end of the tube.

If only a single flare is desired, the flaring cone 45 is swung into position over the end of the tube by releasing the wing nut 69 and rotating the arm 50 180°. The wing nut is then clamped with the flaring cone in position over the tube after which the wrench 57 is applied to the square shank 56 on the upper end of the flaring cone spindle and the spindle rotated clockwise to force the cone down into the end of the tube to produce the desired flare thereon. During clockwise rotation of the threaded lower end of the spindle 49, the cone 45 is prevented from rotating by engagement of the eye 70 with the axle 14. Hence the threads 48 on the spindle will rotate within the threads 47 provided in the cone and cause downward feeding movement of the cone into the tube. After the flare has been produced, the clamping screw 40 may be released and swung 90° so as to release the annular clamping block 25 and free the tube.

If a double flare is desired, after the flaring cone 45 has been swung into position over the end of the tube, the forming die holder 100 is indexed around the axle 14 so as to bring the proper size of forming die over the end of the tube. The wrench 57 is then applied to the upper end of the spindle 49 and rotated clockwise so as to force the point of the cone into the seat 110 provided on the eminence 109 on the forming die 103. The forming die will thereby be pressed downwardly against the urgency of the restoring springs 106 to cause either the face 104 or 105, as the case may be, to engage with the end of the tube and provide the preliminary forming thereof as indicated in phantom outline in Fig. 7. The flaring cone is then retracted by counterclockwise rotation of the wrench 57 and the die holder 100 rotated so as to bring the cut-out portion 111 thereof into position above the tube as indicated in Fig. 1. The handle 57 is again rotated in a clockwise direction so as to force the flaring cone 45 downwardly into the tube thereby bending the inwardly turned lip formed on the end of the tube by the die 103 down into the tube so as to form the end of the tube over on itself and provide the desired double flare thereon. In the formation of either a single flare or a double flare on the end of the tube, the chamfer 28 provided on the clamping block serves to support the outer face of the tube as the flaring cone spreads it into contact therewith, thereby assisting in the formation of an accurately formed flare on the end of the tube.

While I have described my invention in connection with one possible form or embodiment thereof, and, therefore, have used certain specific terms and language herein, it is to be understood that the present disclosure is illustrative rather than restrictive and that changes and modifications may be resorted to without departing from the spirit or the scope of the claims which follows.

Having thus described my invention, what I claim as new and useful and desire to secure by United States Letters Patent, is:

1. A clamping die for a tube flaring tool comprising a body plate apertured to receive the tube to be flared, an annular clamping block slidably mounted on the body plate having a plurality of tube clamping recesses of different sizes formed on its inner face, and a second clamping block located within said annular block and rotatably mounted on the body plate, said second clamping block having a plurality of tube clamping recesses matching the recesses on said annular block.

2. The clamping die of claim 1 including means for clamping said blocks together with a recess in one of said blocks aligned with a matching recess in the other of said blocks to form a clamping die for seizing and holding a tube to be flared.

3. The clamping die of claim 1 including means for maintaining the matching recesses in the two clamping blocks in substantial alignment with one another while permitting relative movement between said blocks.

4. The clamping die of claim 3 wherein said maintaining means includes a pin on one of said blocks and a slot in the other of said blocks for receiving said pin.

5. A clamping die for a tube flaring tool comprising a body plate apertured to receive the tube to be flared, an annular clamping block slidably mounted on the body plate having a plurality of tube clamping recesses of different sizes spaced around the inner face thereof, a second clamping block located within said annular block and rotatably mounted on the body plate said second clamping block being provided with a plurality of tube clamping recesses matching the recesses in said annular block, and a lost-motion connection between said blocks for limiting the extent to which one block can be rotated independently of the other.

6. The clamping die of claim 5 including means for clamping said blocks together with two of the matching recesses aligned to thereby form a clamping die for seizing and holding the tube to be flared.

7. A clamping die for a tube flaring tool comprising a pair of spaced frame plates apertured to receive the tube to be flared, a clamping block supported between said plates for rotation about an axis perpendicular to the surfaces of said plates, said block having a plurality of tube clamping recesses of different sizes spaced about its periphery, said block being indexable to bring any one of said recesses into alignment with the apertures in said plates, an annular clamping block surrounding said first-mentioned block and freely slidable between said plates, said second block having a plurality of tube clamping recesses spaced about its inner face which match the recesses in said first-mentioned block, and means for clamping said blocks together with two of the matching recesses in alignment thereby forming a clamping die for seizing and holding the tube to be flared.

8. The clamping die of claim 7 including a lost-motion connection between said blocks for limiting the extent to which one of said blocks can be rotated independently of the other of said blocks.

9. A clamping die for a tube flaring tool comprising a pair of spaced frame plates apertured to receive the tube to be flared, a clamping block disposed between said plates and pivoted thereon for rotation about an axis perpendicular to the surfaces of said plates, said block being provided about its periphery with a plurality of spaced, tube clamping recesses of different sizes and being indexable to bring any one of said recesses into alignment with the apertures in said plates, an annular clamping block surrounding said first-mentioned block, said latter block being freely slidable between said plates and being provided about its inner face with a plurality of spaced, tube clamping recesses matching the recesses in said first-mentioned block, means connecting said blocks for substantially conjoint rotational movement and independent translational movement to thereby maintain the matching recesses in alignment while permitting separation of the blocks for insertion and removal of the tube to be flared, and means supported by said plates for pressing said annular block into engagement with said first-mentioned block to provide a clamping die for seizing and holding the tube to be flared.

10. The clamping die of claim 9 wherein said connecting means includes a pin attached to one of said blocks engaging within a slot provided in the other of said blocks.

References Cited in the file of this patent

UNITED STATES PATENTS

| | | |
|---|---|---|
| 10,985 | Gregg | May 30, 1854 |
| 278,599 | Robinson | May 29, 1883 |
| 358,445 | Hall | Mar. 1, 1887 |
| 530,166 | Dost | Dec. 4, 1894 |
| 556,304 | Coats | Mar. 10, 1896 |
| 816,304 | Delehant | Mar. 27, 1906 |
| 841,388 | Gapp | Jan. 15, 1907 |
| 870,828 | Jorgensen | Nov. 12, 1907 |
| 924,378 | Porter | June 8, 1909 |
| 981,492 | Stevens | Jan. 10, 1911 |
| 1,038,881 | Hatton | Sept. 17, 1912 |
| 1,267,818 | Stephenson | May 28, 1918 |
| 1,482,148 | Ratigan | Jan. 29, 1924 |
| 1,530,819 | Ensign | Mar. 24, 1925 |
| 1,571,267 | Hartsock | Feb. 2, 1926 |
| 1,851,276 | Gordon | Mar. 29, 1932 |
| 1,950,154 | Rosenberg | Mar. 6, 1934 |
| 2,370,089 | Swyers | Feb. 20, 1945 |
| 2,438,989 | Billman | Apr. 6, 1948 |
| 2,505,665 | Franck | Apr. 25, 1950 |
| 2,595,036 | Wolcott | Apr. 29, 1952 |
| 2,620,013 | DeVoss | Dec. 2, 1952 |
| 2,662,575 | Wolcott | Dec. 15, 1953 |

FOREIGN PATENTS

| | | |
|---|---|---|
| 8,632 | Austria | Aug. 11, 1902 |
| 10,727 | Great Britain | May 8, 1906 |
| 8,038 | Great Britain | Apr. 3, 1909 |
| 248,409 | Germany | June 21, 1912 |
| 313,458 | Germany | July 10, 1919 |
| 565,662 | Great Britain | Nov. 21, 1944 |